US 9,868,396 B2

(12) United States Patent
Watanabe

(10) Patent No.: US 9,868,396 B2
(45) Date of Patent: Jan. 16, 2018

(54) VEHICLE-DRIVE ASSISTING APPARATUS

(71) Applicant: AISIN SEIKI KABUSHIKI KAISHA, Kariya-shi, Aichi (JP)

(72) Inventor: Kazuya Watanabe, Anjo (JP)

(73) Assignee: AISIN SEIKI KABUSHIKI KAISHA, Kariya-shi, Aichi (JP)

( * ) Notice: Subject to any disclaimer, the term of this patent is extended or adjusted under 35 U.S.C. 154(b) by 35 days.

(21) Appl. No.: 14/424,500

(22) PCT Filed: Aug. 23, 2013

(86) PCT No.: PCT/JP2013/072575
§ 371 (c)(1),
(2) Date: Feb. 27, 2015

(87) PCT Pub. No.: WO2014/050388
PCT Pub. Date: Apr. 3, 2014

(65) Prior Publication Data
US 2015/0203035 A1 Jul. 23, 2015

(30) Foreign Application Priority Data

Sep. 26, 2012 (JP) .................................. 2012-213183

(51) Int. Cl.
*G06K 9/00* (2006.01)
*B60R 1/00* (2006.01)
(Continued)

(52) U.S. Cl.
CPC .............. *B60R 1/00* (2013.01); *B60W 40/06* (2013.01); *B60W 40/064* (2013.01);
(Continued)

(58) Field of Classification Search
None
See application file for complete search history.

(56) References Cited

U.S. PATENT DOCUMENTS 4,939,651 A * 7/1990 Onishi ................. G05D 1/0217
180/167
7,815,313 B2 * 10/2010 Ito ......................... G08G 1/167
340/425.5
(Continued)

FOREIGN PATENT DOCUMENTS

EP    2 573 594 A1    3/2013
JP    2005-271718 A    10/2005
(Continued)

OTHER PUBLICATIONS

International Preliminary Report on Patentability dated Apr. 9, 2015, issued by the International Bureau of WIPO in counterpart International Application No. PCT/JP2013/072575.
(Continued)

*Primary Examiner* — Hadi Akhavannik
(74) *Attorney, Agent, or Firm* — Sughrue Mion, PLLC

(57) ABSTRACT

Provided is a vehicle drive assisting apparatus capable of allowing a driver to recognize a road surface condition which can be used for reference in steering following wheels or a road surface condition which can be used for reference in turning. Such vehicle-drive assisting apparatus includes a wheel position storing section storing a position of a wheel when a vehicle effects traveling, a road surface information acquiring section acquiring road surface information indicating a road surface condition of a road surface on which the vehicle has traveled, and a display image generating section generating a display image of the road surface information stored and relating to the wheel position on a displaying unit provided in the vehicle.

11 Claims, 7 Drawing Sheets

(51) Int. Cl.
*B62D 15/02* (2006.01)
*B60W 40/06* (2012.01)
*B60W 40/064* (2012.01)
*G01C 21/36* (2006.01)
*B60W 50/14* (2012.01)

(52) U.S. Cl.
CPC ......... *B60W 50/14* (2013.01); *B62D 15/0295* (2013.01); *G01C 21/3697* (2013.01); *G06K 9/00798* (2013.01); *B60R 2300/304* (2013.01); *B60R 2300/305* (2013.01); *B60R 2300/607* (2013.01); *B60R 2300/70* (2013.01); *B60R 2300/8086* (2013.01); *B60W 2050/146* (2013.01); *B60W 2510/22* (2013.01); *B60W 2520/28* (2013.01); *B60W 2540/18* (2013.01); *B60W 2550/14* (2013.01); *G06K 9/00791* (2013.01)

(56) References Cited

U.S. PATENT DOCUMENTS

| | | | | |
|---|---|---|---|---|
| 2001/0045891 | A1* | 11/2001 | Nakao | G08G 1/0104 340/426.1 |
| 2005/0125125 | A1* | 6/2005 | Matsumoto | G08G 1/167 701/41 |
| 2005/0212225 | A1 | 9/2005 | Suzuki et al. | |
| 2006/0030987 | A1* | 2/2006 | Akita | B62D 15/025 701/41 |
| 2006/0287800 | A1* | 12/2006 | Watanabe | B62D 15/0275 701/96 |
| 2010/0013670 | A1* | 1/2010 | Hueppauff | B62D 15/028 340/932.2 |
| 2010/0222958 | A1* | 9/2010 | Kobayashi | B60G 17/0195 701/31.4 |
| 2010/0222960 | A1* | 9/2010 | Oida | B60G 17/0195 701/31.4 |
| 2013/0116972 | A1* | 5/2013 | Hanatsuka | B60T 8/172 702/167 |

FOREIGN PATENT DOCUMENTS

| | | |
|---|---|---|
| JP | 2010-095135 A | 4/2010 |
| JP | 2010-113532 A | 5/2010 |
| JP | 2011-242303 A | 12/2011 |
| WO | 2011/010346 A1 | 1/2011 |

OTHER PUBLICATIONS

International Search Report of PCT/JP2013/072575 dated Sep. 24, 2013.

* cited by examiner

VEHICLE-DRIVE ASSISTING APPARATUS

CROSS REFERENCE TO RELATED APPLICATIONS

This is a National Stage of International Application No. PCT/JP2013/072575 filed Aug. 23, 2013, claiming priority based on Japanese Patent Application No. 2012-213183 filed Sep. 26, 2012, the contents of all of which are incorporated herein by reference in their entirety.

TECHNICAL FIELD

The present invention relates to a vehicle-drive assisting apparatus assisting a driver by displaying information relating to vehicle drive on a monitor mounted in a vehicle.

BACKGROUND ART

Conventionally, there has been utilized a vehicle-drive assisting apparatus capturing an area which can be a dead angle for a driver with an onboard camera and displaying a captured image on a monitor. With some vehicle-drive assisting apparatuses of the above-noted kind, a captured image including a dead angle captured by an onboard camera is subjected to a viewpoint conversion to a viewpoint from above the self vehicle, thus being converted into a bird's-eye-view image, which is then displayed on a monitor. One example of such technique is disclosed in Patent Document 1.

The vehicle-drive assisting apparatus described in Patent Document 1 is for use in a vehicle for off-road traveling such as traveling in/on a rocky area, a gravel road, etc. Thus, in order to prevent wheels from advancing onto a soil having poor ground-surface condition or from going off the shoulder of a road, the apparatus includes an image capturing means for capturing a destination image showing an advancing direction of the vehicle, a steering angle detecting means for detecting a steering angle of the vehicle, a course image generating means estimating a traveling course of each wheel provided on the advancing side of the vehicle based on the steering angle and generating a course image showing a traveling course of the wheel as seen from a viewpoint of the image capturing means, a superposed image generating means for generating a superposed image comprising the destination image superposed with the course image, and an image displaying means for displaying the superposed image. With this, the driver can view the situation around the vehicle and the superposed image indicating the traveling course of the wheels of the vehicle on the monitor, thus confirming the traveling course. Therefore, it becomes possible for the driver to effect a traveling for avoiding going-off of the wheel or a traveling onto a rocky terrain, by changing the steering angle while viewing the image displayed on the monitor.

PRIOR-ART DOCUMENT

Patent Document

Patent Document 1: International Patent Application Publication No. 2011/010346 (paragraphs [0005-0026], FIG. 9)

SUMMARY OF THE INVENTION

Problem to be Solved by Invention

In the above, in the case of off-road traveling such as traveling in/on a rocky area, a gravel road, etc., the traveling is effected basically to cause the rear wheels of the vehicle to pass the same place passed by the front wheels of the vehicle. This is because the driver of the vehicle drives the vehicle with viewing the forward side, the driver can appropriately select a place to be passed by the front wheels, so vehicle movement during the traveling can be stable if the rear wheels too are caused to pass such appropriately selected place.

However, according to the technique disclosed in Patent Document 1, at the time of forward traveling, an expected path to be passed thereby is displayed in the superposed manner, it is difficult for the driver to recognize, based on the superposed image being displayed, a road surface condition to be passed by the rear wheels (following wheels in the case of forward traveling) or a condition of a road surface to be passed by the wheels when a turning steering operation for e.g. reverse traveling is to be effected.

In view of the above-described problem, the object of the present invention is to provide a vehicle drive assisting apparatus capable of allowing a driver to recognize a road surface condition which can be used for reference in steering following wheels or a road surface condition which can be used for reference in turning.

Solution for Solving the Problem

For accomplishing the above-noted object, according to a characterizing feature of a vehicle-drive assisting apparatus relating to the present invention, the apparatus comprises:

a wheel position storing section storing a position of a wheel when a vehicle effects traveling;

a road surface information acquiring section acquiring road surface information indicating a road surface condition of a road surface on which the vehicle has traveled; and a display image generating section generating a display image of the road surface information stored in the wheel position storing section and relating to the wheel position on a displaying unit provided in the vehicle.

With the above-described characterizing feature, as the driver checks the display image, the driver can specify the condition of the road surface of the place passed previously by the wheels. Therefore, it becomes possible for the driver to readily recognize a road surface condition which can be used for reference in steering following wheels or a road surface condition which can be used for reference in turning.

Further, preferably, the display image generating section superposes the road surface information with the wheel position stored in the wheel position storing section.

With the above-described arrangement, the drive can recognize the position passed thus far by the wheels and the road surface information in correlation with each other. Therefore, it becomes possible for the driver to readily imagine the condition of the road surface.

Further, preferably, the wheel comprises a preceding wheel located on the forward side in the traveling direction of the vehicle.

With the above-described arrangement, because only a short period has passed since disappearance of the preceding wheel located on the forward side in the traveling direction from the driver's view, by the driver's confirming the traveling path of the preceding wheel, the driver can specify the traveling condition at this point more clearly. Therefore, since it is possible to cause the driver to recognize the track of the preceding wheel until arrival of the vehicle at the present location, the driver can easily estimate the position to be traveled by the following wheel when the vehicle is to travel from the current position.

Also, preferably, the apparatus further comprises a following wheel marker generating section generating a marker for specifying a position of a following wheel of the vehicle; and the display image generating section superposes the marker with the position of the following wheel.

With the above-described arrangement, since the following wheel is displayed in the displaying screen, it becomes possible to cause the driver to readily recognize the position of the following wheel.

Also, preferably, the wheel comprises a following wheel located on the rear side in the traveling direction of the vehicle.

With the above-described arrangement, in effecting a turn in particular, the driver can readily recognize the position to be traveled by the following wheel (previously the preceding wheel). Further, if a forward traveling and a reverse traveling are effected in repetition in a short period of time, the road surface condition too can be imagined even more easily.

Preferably, the marker comprises a bird's-eye-view of the vehicle.

With the above-described arrangement, it becomes possible to cause the driver to readily recognize the position of the following wheel of the vehicle.

Preferably, the road surface information comprises roughness information indicating roughness on the road surface.

With the above-described arrangement, it becomes possible to cause the driver to readily recognize roughness on the road surface.

Preferably, the roughness information comprises suspension information indicating a suspension stroke length of a suspension mechanism suspending the wheel.

With the above-described arrangement, it is possible to show clearly an expansion/contraction state of the suspension to the driver. Thus, in effecting traveling of the following wheel or a turn, the driver can avoid e.g. a position which can cause significant or violent expansion/contraction of the suspension. Therefore, the vertical behavior of the vehicle can be readily stabilized.

Further, preferably, the road surface information comprises information indicating slipperiness of the road surface.

With the above-described arrangement, the driver can easily recognize slipperiness of the road surface.

Further, preferably, the information indicating slipperiness comprises slip information indicating slipping state of the wheel.

With the above-described arrangement, it is possible to clearly show the driver the position where slippage of the preceding wheel has occurred, so that in effecting traveling of the following wheel or a turn, the driver can avoid such slipped position appropriately. Therefore, slippage can be prevented.

Further, preferably, the road surface information comprises height information indicating height from the road surface traveled by the vehicle to a bottom face of a body of the vehicle.

With the above-described arrangement, it is possible to clearly show a height from the road surface traveled by the vehicle to a bottom face of a body of the vehicle from the previous position to the current position. Therefore, it becomes possible to cause the driver to easily imagine the roughness condition on the road surface. Thus, the information can be suitably utilized for determination of a position to be traveled in effecting traveling of the following wheel or a turn.

Further, preferably, the display image generating section synthesizes the traveling position of the wheel stored in the wheel position storing section and the road surface information with a surrounding image based on a captured image capturing a view surrounding the vehicle.

With the above-described arrangement, the traveled position and the road surface information can be displayed simultaneously on the display unit, so that it is possible to cause the driver to easily imagine the situation of the surrounding at the time of traveling.

Further, preferably, the surrounding image comprises a bird's-eye-view image based on a viewpoint upwardly of the vehicle.

With the above-described arrangement, it is possible to display the surrounding of the vehicle along the entire circumference. Therefore, it is possible to readily imagine the path traveled up to the arrival at the current position.

EMBODIMENTS

Figure 1:
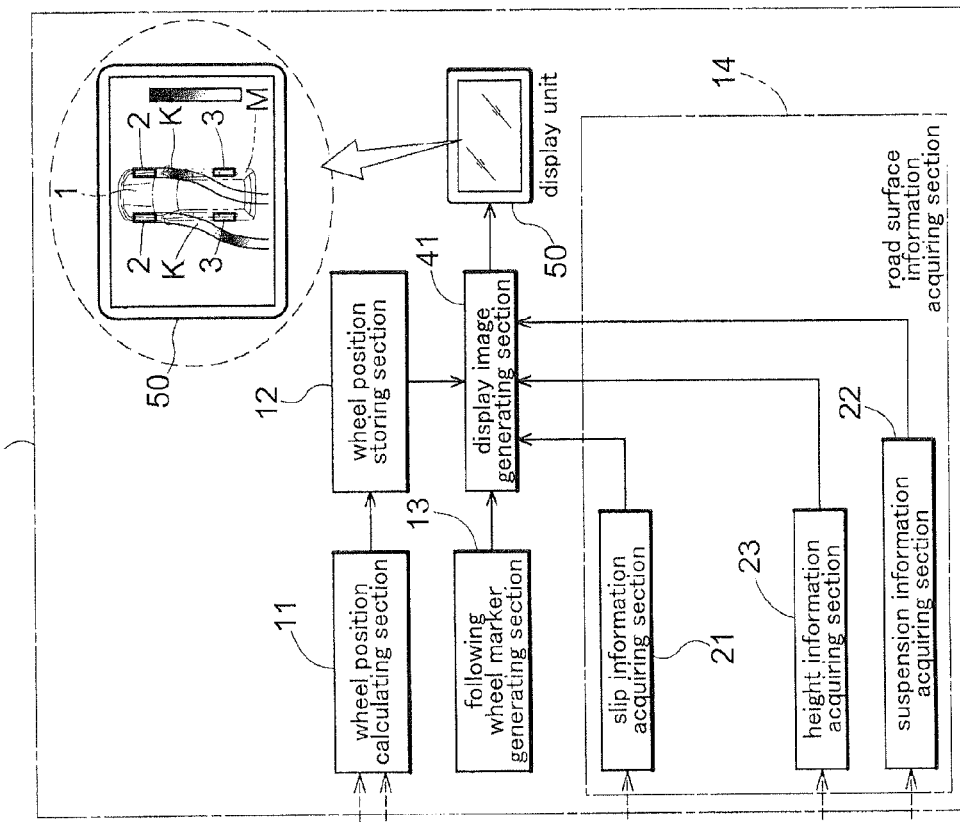
FIG. 1 is a block diagram schematically showing a configuration of a vehicle-drive assisting apparatus.
Figure 1:
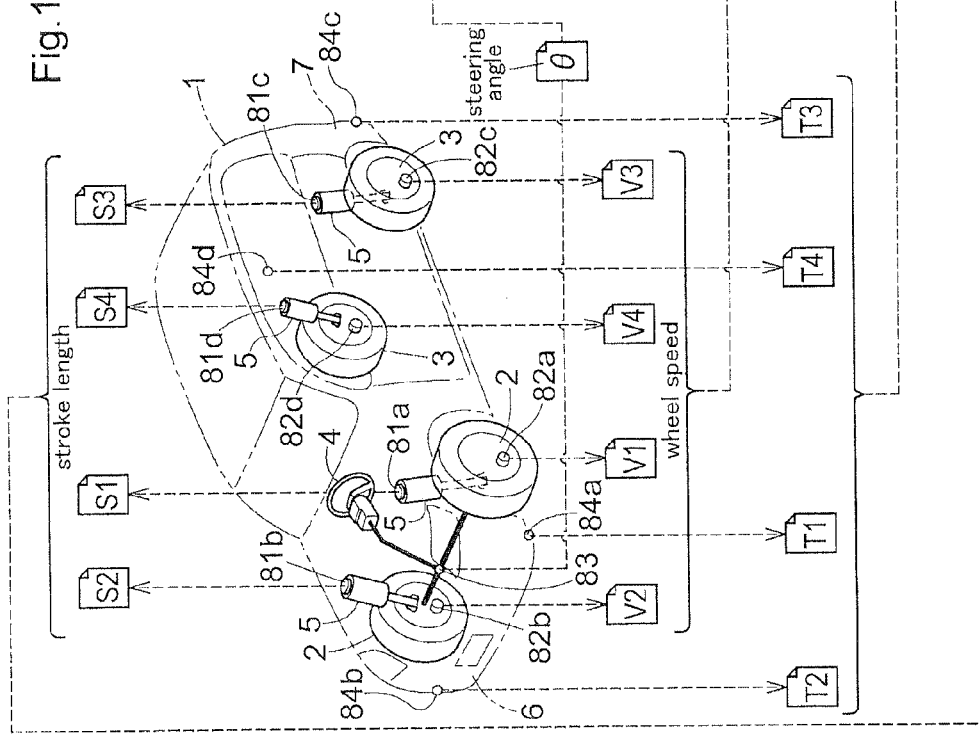

A vehicle-drive assisting apparatus 100 relating to the present invention has a function of clearly indicating a road surface condition to a driver (a passenger) of a vehicle. Next, the present embodiment will be described in details. FIG. 1 shows a block diagram schematically showing a configuration of this vehicle-drive assisting apparatus 100. As shown in FIG. 1, the vehicle-drive assisting apparatus 100 is provided in a vehicle 1 and includes respective functional sections of a wheel position calculating section 11, a wheel position storing section 12, a following wheel marker generating section 13, a road surface information acquiring section 14, and a display image generating section 41. In the instant embodiment, the road surface information acquiring section 14 includes a slip information acquiring section 21, a suspension information acquiring section 22, and a height information acquiring section 23. The respective functional sections include a CPU as a core component thereof and the functional sections for implementing various operations associated with clear indication of road surface condition are comprised of hardware and/or software.

The wheel position calculating section 11 calculates a position of a wheel when the vehicle 1 has traveled. Such position of a wheel (to be referred to as "wheel position" hereinafter) at the time of traveling is designated with a mark K in the drawings relating to this embodiment. In the instant embodiment, the wheel position K calculated by the wheel position calculating section 11 is a position of a preceding wheel located on the forward side in the traveling direction of the vehicle 1. In other words, it can be said that the wheel position K indicates a traveling path of the wheel in a previous traveling of the vehicle 1. The forward side in the traveling direction corresponds to the forward side of the vehicle 1 when this vehicle 1 travels forwards or corresponds to the rear side of the vehicle 1 when the vehicle 1 travels backward. Accordingly, the preceding wheel located on the forward side in the traveling direction corresponds to a pair of right and left front wheels 2 of the vehicle 1 when the vehicle 1 travels forwards or corresponds to a pair of right and left rear wheels 3 of the vehicle 1 when the vehicle 1 travels backwards.

The wheel position K refers to a path traveled by the vehicle 1 until it reached the current position. In the instant embodiment, the vehicle position K corresponds to a path on a coordinate system with the vehicle 1 constituting the basis thereof. The wheel position calculating section 11 calculates such wheel position K. The wheel position K is calculated with using steering angle information indicating a steering angle θ of the front wheels 2 operated by a steering wheel 4 of the vehicle 1 detected by a steering angle detector 83 and wheel speed information indicating wheel speeds V1, V2, V3, V4 of the pair of right and left front wheels 2 and the pair of right and left rear wheels 3 detected by speed detectors 82a, 82b, 82c, 82d. This calculation can be effected with using any known method. Thus, explanation thereof is omitted herein. The wheel position K calculated by the wheel position calculating section 11 is transmitted to the wheel position storing section 12 which will be described next.

The wheel position storing section 12 stores the wheel position K. The wheel position K stored by the wheel position storing section 12 is the wheel position K transmitted from the wheel position calculating section 11 described above.

The road surface information acquiring section 14 acquires road surface information indicating a road surface condition of a road surface traveled by the vehicle 1. In the instant embodiment, the road surface information acquiring section 14 acquires road surface information while the vehicle 1 is traveling. In the instant embodiment, the road surface information corresponds to information indicating slipperiness of the road surface.

In particular, in the present embodiment, this information indicating slipperiness of the road surface corresponds to slip information indicating slip condition of the preceding wheel. The slip condition can indicate whether the wheel is slipping or not or can indicate a wheel racing ratio of the wheel as a degree of slippage. Whether the wheel is slipping or not can be specified based on the wheel speed information indicating the wheel speeds V1, V2, V3, V4 detected by the speed detectors 82a, 82b, 82c, 82d.

Further, the wheel racing ratio can be obtained as a ratio of the wheel speed of the respective wheel relative to a reference wheel speed Vr which is the lowest value among all of the wheel speeds. In such case, the wheel racing ratios R1, R2, R3, R4 of the respective wheels are:

$R1=V1/Vr$ $R2=V2/Vr$ $R3=V3/Vr$ $R4=V4/Vr$

And, the values thereof can be 1.0 or greater (greater than 100% in the case of percentage notation). Incidentally, in case a rate of change (acceleration) of the reference wheel speed Vr obtained from the reference wheel speed Vr calculated and outputted over time (repetition cycle of the calculation is set from 0.5 to 1.0 sec.) is greater than a predetermined value (e.g. 1G), then, it may be assumed that all the wheels are racing as running on muddy road for instance. Such slip information is calculated and acquired by the slip information acquiring section 21.

The display image generating section 41 generates a display image to be displayed on a display unit 50 provided with road surface information relating to a stored wheel position. Here, the language: road surface information relating to a stored wheel position refers, in other words, to road surface information corresponding to a stored wheel position. And, the stored wheel position K refers to the position of the preceding wheel stored in the wheel position storing section 12. Therefore, the display image generating section 41 acquires the wheel position K by referring to the wheel position storing section 12. In the instant embodiment, the road surface information relating to the wheel position is information indicating slipperiness of the position traveled by the wheel.

In the instant embodiment, the display image generating section 41 superposes the road surface information with the stored position of the preceding wheel. Namely, the display image generating section 41 generates the display image by superposing the slip information which is information indicating slipperiness with the position traveled by the preceding wheel.

Further, the display image generating section 41 superposes a marker M with the position of the preceding wheel. Here, the marker M refers to a marker M generated by the following wheel marker generating section 13 which will be described later. The marker M is transmitted from the following wheel marker generating section 13 to the display image generating section 14. The display unit 50 provided in the vehicle 1 corresponds to a monitor provided in the vehicle cabin. The display image generating section 41 generates a display image in the manner described above.

The following wheel marker generating section 13 generates the marker M specifying the position of the following wheel of the vehicle 1. The following wheel refers to a wheel located on the rear side in the traveling direction. The rear side in the traveling direction corresponds to the rear side of the vehicle 1 when this vehicle 1 travels forwardly or corresponds to the forward side of the vehicle 1 when this vehicle 1 travels backwards.

Therefore, the following wheel located on the rear side in the traveling direction corresponds to the pair of right and left rear wheels 3 of the vehicle 1 when the vehicle 1 travels forwards or corresponds to the pair of right and left front wheels 2 of the vehicle 1 when the vehicle 1 travels backwards. The marker M specifying the position of the following wheel can be a graphic image showing the position of the following wheel or can alternatively be a graphic image representing the entire vehicle 1. Based on such graphic image, the position of the following wheel of the vehicle 1 can be grasped.

Figure 2:
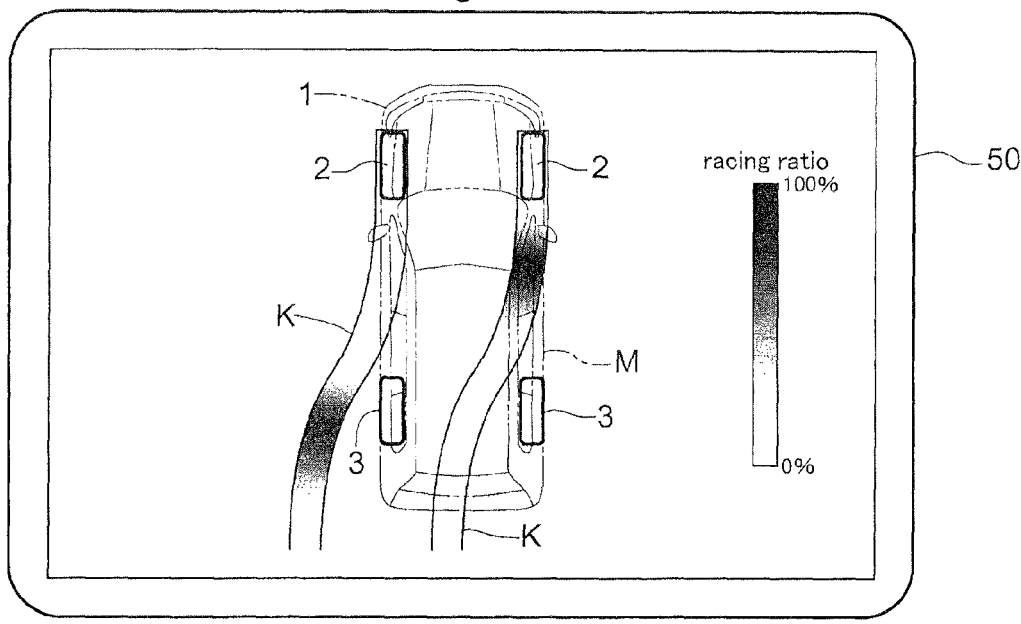
FIG. 2 is a view showing one example of a display image comprising a traveling track superposed with slip information.

FIG. 2 shows an example of the display image including the slip information superposed with the wheel position K. In the case of the example shown in FIG. 2, the marker M generated by the following wheel maker generating section 13 is shown in a bird's-eye-view of the vehicle 1. There are also displayed the forward traveling state of the vehicle 1 and the rear wheels 3 as the following wheels. Further, with the wheel position K of the preceding wheel, the slip information is superposed. In the case of the example shown in FIG. 2, a racing ratio is shown as the slip information and this racing ratio is displayed with changes of color corresponding to varied racing ratio values. On the right-hand side within the display screen, there is shown a relationship diagram between wheel racing ratios and colors.

In the case of the example shown in FIG. 2, there is shown a situation in which an "out-of-bounds" of the front wheel 2 has occurred with an operation of the preceding wheel by the steering wheel 4, with occurrence of slippage of a predetermined racing ratio. With this, a passenger of the vehicle 1 can grasp not only through what path the front wheel 2 has traveled to reach the current position, but also at what position the slippage has occurred. Incidentally, it will be convenient if an arrangement is made to display the current condition of the preceding wheel at the current position of the preceding wheel.

Further, the road surface information can also be roughness information indicating roughness of road surface. For instance, the roughness information can be suspension information indicating a suspension stroke length of a suspension 5 included in a suspension mechanism suspending the preceding wheel. In this regard, a shown in FIG. 1, the vehicle 1 includes the suspension mechanism for the respective front wheels 2 and rear wheels 3 for stabilizing behavior of the vehicle 1 by restraining vertical wobbling of the vehicle body; and this suspension mechanism is comprised of the suspension 5.

In the instant embodiment, the term: stroke length is defined based on a contraction amount of the suspension 5 when the vehicle 1 with no load being mounted thereon is placed still on a flat road surface, and an amount of contraction from this reference is defined as a plus (positive) stroke length and an amount expanded therefrom is defined as a minus (negative) stroke length, respectively. Such stroke length is detected by respective stroke length detectors 81a, 81b, 81c, 81d. For each wheel, suspension information indicating a stroke length S1, S2, S3, S4 of the suspension 5 is calculated and acquired by the suspension information acquiring section 22. In this case, the display image generating section 41 superposes the suspension information with the wheel position K of the preceding wheel, thus generating a display image.

Figure 3:
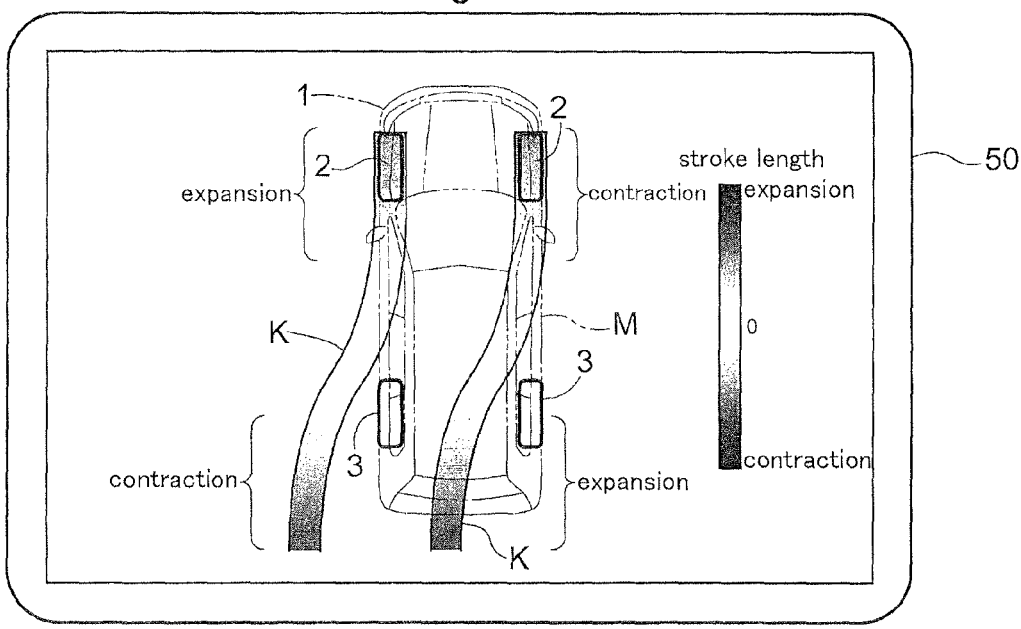
FIG. 3 is a view one example of a display image comprising a traveling track superposed with suspension information.

FIG. 3 shows an example of display image comprised of such suspension information superposed with the wheel position K. In the example of FIG. 3, like FIG. 2, a maker M generated by the following wheel marker generating section 13 is shown in the form of a bird's-eye-view image of the vehicle 1, and there are also shown a forward traveling state of the vehicle 1 as well as the rear wheels 3 as following wheels. Further, the suspension information is superposed with the wheel position K of the preceding wheel. In the case of the example shown in FIG. 3, the stroke length is shown as the suspension information, with variation of colors in correspondence with variation of the stroke length. On the right side in the display screen, there is shown a relationship diagram between the stroke length and the color. Namely, in the case of the example shown in FIG. 3, displaying is effected such that the denser the color, the greater the amount of contraction or expansion. Incidentally, it is preferred to arrange such that the color will be varied between the case of contraction of the suspension and expansion of the suspension.

In the example shown in FIG. 3, it is shown that the suspension mounted on the side of the left front wheel 2 was contacted and the suspension mounted on the side of the right front wheel 2 was expanded prior to a predetermined period and thereafter, via substantially the reference state of the stroke length, at present the suspension mounted on the side of the left front wheel 2 is expanded and the suspension mounted on the side of the right front wheel 2 is contracted. With this, a passenger of the vehicle 1 can grasp through what courses the front wheels 2 have taken to reach the respective current positions and can grasp also the stroke length of the suspension 5 of each position.

Further, the road surface information can also be height information indicating a height from the road surface on which the vehicle 1 travels to the bottom face of the body of this vehicle 1. The language: the bottom face of the body refers to the lower end portion of the body such as the lower face of a bumper for instance. Therefore, in the case of using the height information as the road surface information, it is preferred that sonars 84a, 84b, 84c, 84d be directed perpendicularly downwards on the right and left sides of a front bumper 6 and a rear bumper 7, respectively. Instead of the sonars 84a, 84b, 84c, 84d, laser sensors can be employed also. With this, it becomes possible to detect the height from the road surface to the bottom face of the body of the vehicle 1. Detection result of the respective sonars 84a, 84b, 84c, 84d is calculated and acquired by the the height information acquiring section 23 as height information indicating heights T1, T2, T3, T4. In this case, the display image generating section 41 superposes the height information with the wheel position K of the preceding wheel, thus generating the display image. Further, instead of using the sonars 84a, 84b, 84c, 84d or the laser sensors, the road surface height information can also be acquired by effecting an image recognition processing on an image captured by an onboard camera.

Figure 4:
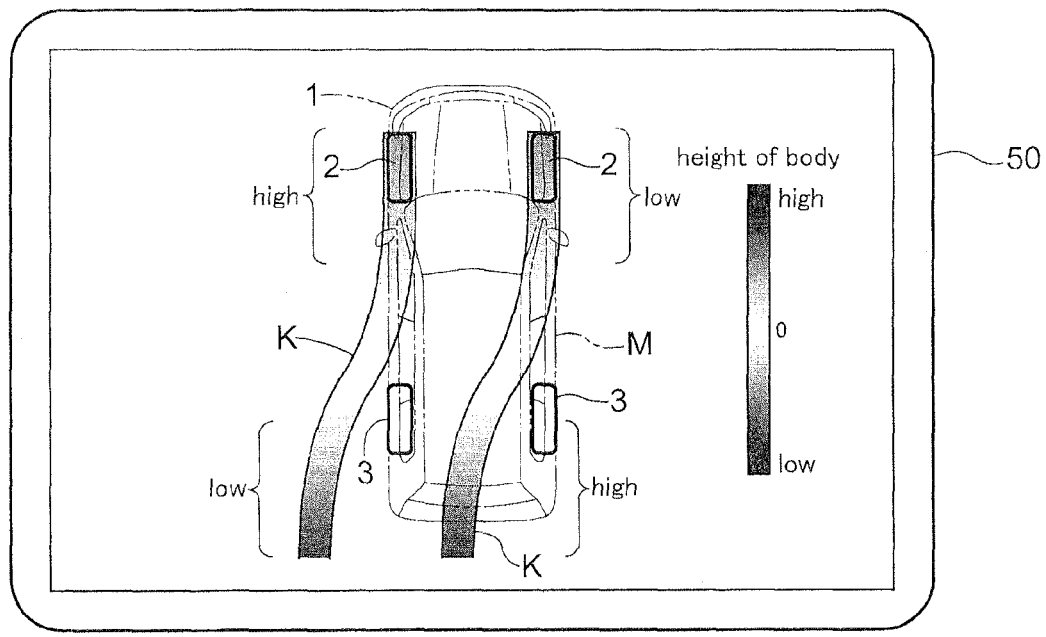
FIG. 4 is a view showing one example of a display image comprising a traveling track superposed with height information.

FIG. 4 shows an example of display image superposing height information with the wheel position K. In the example of FIG. 4, like FIG. 2, the maker M generated by the following wheel marker generating section 13 is shown in the form of a bird's-eye-view image of the vehicle 1, and there are also shown a forward traveling state of the vehicle 1 as well as the rear wheels 3 as following wheels. Further, the height information is superposed with the wheel position K of the preceding wheel. In the case of the example shown in FIG. 4, there is shown with variation of colors in correspondence with variation of the height from the road surface to the bottom face of the body of the vehicle 1. On the right side in the display screen, there is shown a relationship diagram between the height and the color. Namely, in the case of the example shown in FIG. 4, displaying is effected such that the denser the color, the greater or smaller the amount of height, relative to the reference value. Incidentally, it is preferred to arrange such that the color will be varied between the case of greater height and smaller height.

In the example shown in FIG. 4, it is shown that the height of the body on the side of the left front wheel 2 was low and the height of the body on the side of the right front wheel 2 was high prior to a predetermined period and thereafter, via substantially the reference state of the stroke length, at present the height of the body on the side of the left front wheel 2 has become higher and the height of the body on the side of the right front wheel 2 has become lower. With this, a passenger of the vehicle 1 can grasp through what courses the front wheels 2 have taken to reach the respective current positions thereof and can grasp also the body height at each position.

As described above, according to the instant embodiment, the driver, through checking the display image, can specify the condition of the road surface at a location where the wheel passed previously. Accordingly, it becomes possible for the driver to readily grasp a condition of road surface which can be referred to in steering the following wheel or a condition of the road surface which can be referred to in making a turn.

Other Embodiments

In the foregoing embodiment, it was explained that the display image generating section 41 generates a display image with superposing suspension information as roughness information with the wheel position K of the preceding wheel. However, the application range of the present invention is not limited thereto. It is also possible to generate a display image with superposing roughness information indicating condition of roughness of a road surface on which the vehicle 1 has traveled with the wheel position K of the preceding wheel. Such roughness of road surface can be obtained in a manner described next.

Figure 5:
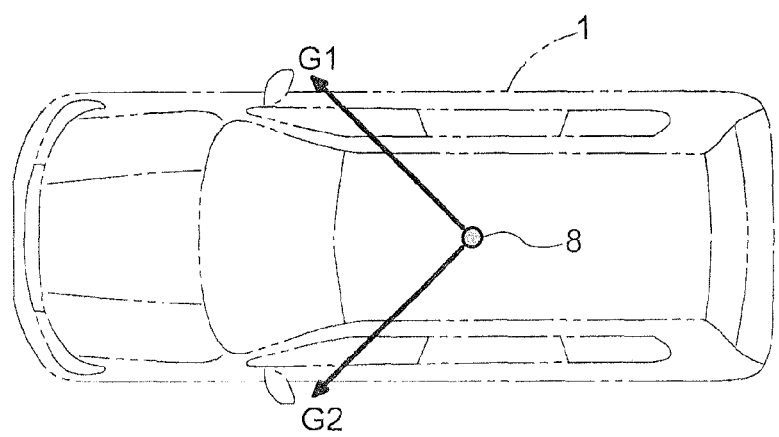
FIG. 5 is a view showing disposing relationship of acceleration sensors.
Figure 6:
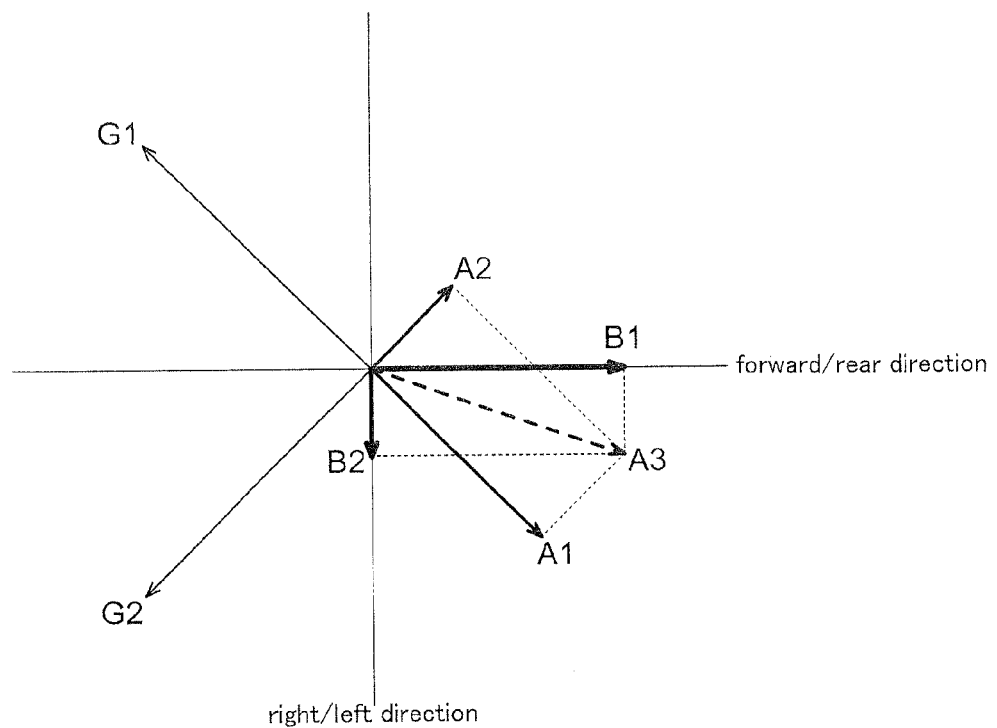
FIG. 6 is a view illustrating synthesis of detection results of the acceleration sensors.

As shown in FIG. 5, at the center of the vehicle 1, there is disposed an acceleration sensor 8 capable of detecting accelerations in directions of two axes perpendicular to each other. In this case, the directions of the two axes are a direction G1 which is an obliquely right forward direction and a direction G2 which is an obliquely left forward direction, relative the longitudinal direction of the vehicle 1 as the center therebetween, as shown in FIG. 6. The acceleration sensor 8 can be of any configuration as long as it allows detection of accelerations in the direction G1 and the direction G2 respectively and can be a single sensor or separate sensors.

Figure 7:
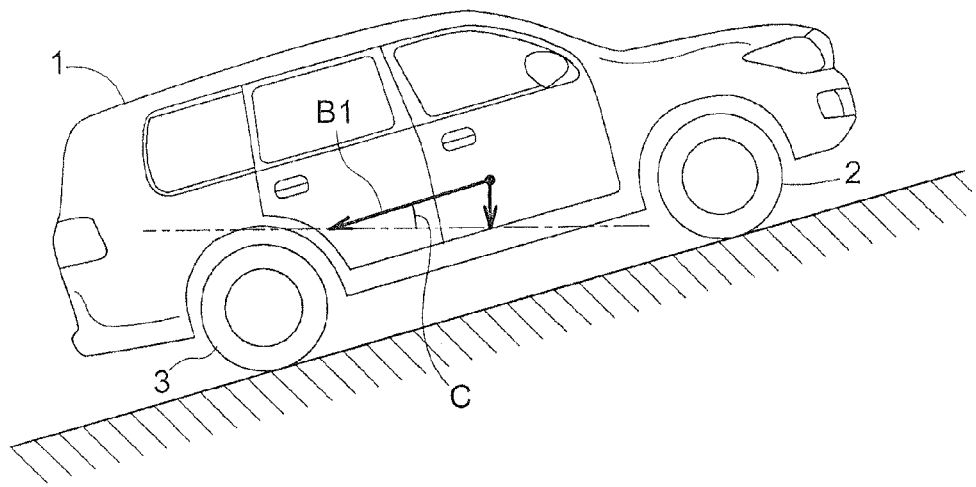
FIG. 7 is a view illustrating calculation of a tilt angle.

As shown in FIG. 6, let us assume that as an acceleration in the direction G1, a vector A1 has been detected and as an acceleration in the direction G2, a vector A2 has been detected. Then, a vector sum A3 of the vectors A1 and A2 is calculated and obtained. This vector A3 is decomposed into a component in the forward/rear direction and a component in the right/left direction of the vehicle 1, whereby a component B1 in the forward/rear direction and a component B2 in the right/left direction are obtained. For instance, in case a slope angle in the forward/rear direction of the vehicle 1 is to be obtained, the component B1 in the forward/rear direction will be used. Specifically, as shown in FIG. 7, supposing 1G being a component in the perpendicular direction, the above can be obtained as a slope angle: C=arcsin (B1). Similarly, in case a slope angle in the right/left direction of the vehicle 1 is to be obtained, calculation can be effected with using the component B2 in the right/left direction. In this way, a slope angle at the location can be calculated.

Incidentally, the accelerations detected by the acceleration sensor 8 include the accelerations in the forward/rear direction and the right/left direction produced in association with traveling of the vehicle 1. Here, the acceleration in the forward/rear direction produced in association with traveling of the vehicle 1 can be obtained from e.g. a speed of the vehicle 1 detected by a wheel speed sensor. Further, the acceleration in the right/left direction produced in association with traveling of the vehicle 1 can be obtained from e.g. an angular speed of the vehicle 1 detected by a yaw rate sensor mounted in the vehicle 1. Then, preferably, with using the forward/rear direction acceleration and the right/left acceleration produced in association with traveling of the vehicle 1, the slope angle obtained by the acceleration sensor 8 is adjusted. Specifically, there is effected a correction operation of subtracting an angular component based on the forward/rear direction generated in association with traveling of the vehicle 1 from the forward/rear direction slope angle obtained by the acceleration sensor 8. Simultaneously, there is effected a correction operation of subtracting an angular component based on the right/left direction generated in association with traveling of the vehicle 1 from the right/left direction slope angle obtained by the acceleration sensor 8.

Figure 8:
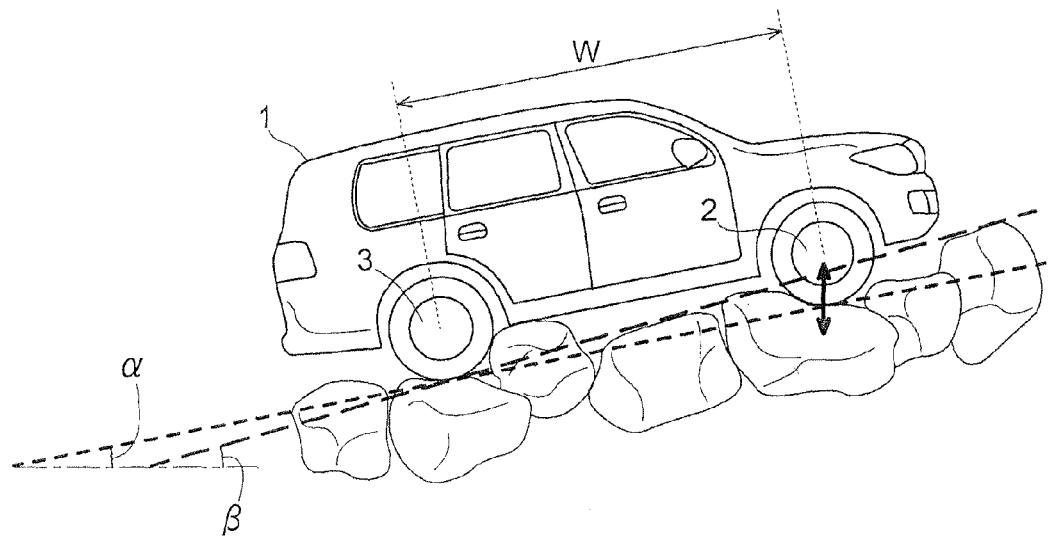
FIG. 8 is a view illustrating calculation of a height of roughness on a road surface.

Here, FIG. 8 shows a state wherein the vehicle 1 is traveling on an upslope having road surface roughness. Now, W designates a distance between the front wheel 2 and the rear wheel 3 of the vehicle 1, a designates the slope angle at this location, and β designates the overall slope angle. Preferably, this slope angle β is obtained from an average value within a predetermined period. In this case, the height of the road surface roughness of each wheel at the current location can be obtained as follows.

$$\text{height of roughness} = \text{stroke amount} + W \times \sin \alpha - \sin \beta.$$

In this way, the height of roughness at the current location can be readily obtained by the above formula.

It is also possible to display the above-described slip information in addition to such roughness information. Further, it is also possible as a matter of course to configure such that the display image is generated with superposing not only the roughness information, but also the suspension information or height information described above.

Figure 9:
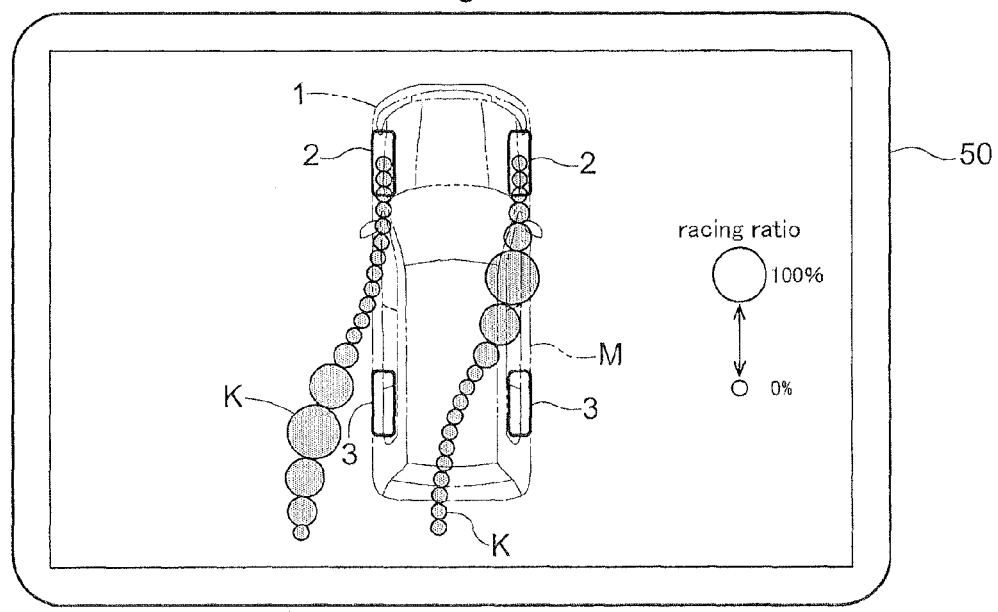
FIG. 9 is a view showing one example of a display image indicating traveling track relating to a further embodiment.

In the above embodiment, it was explained that the wheel position K comprises a line having a predetermined width. However, the application range of the present invention is not limited thereto. For instance, it is also possible as a matter of course to configure the wheel position K with using a circle that passes through the right and left centers of the preceding wheels. One example of such display image is shown in FIG. 9. In the example shown in FIG. 9 also, like the foregoing embodiment, the maker M generated by the following wheel marker generating section 13 is shown in the form of a bird's-eye-view image of the vehicle 1, and there are also shown a forward traveling state of the vehicle 1 as well as the rear wheels 3 as following wheels. Preferably, the circle disposed at the center of the wheel position K has its diameter varied according to the vehicle condition or the road surface condition.

Namely, in case slip information is employed as a vehicle condition, as shown in FIG. 9, preferably, the higher the racing ratio, the greater the diameter of the circle, and the lower the racing ratio, the smaller the diameter of the circle. Further, in case suspension information is employed as a vehicle condition, preferably, the greater the stroke length, the greater the diameter of the circle, and the smaller the stroke length, the smaller the diameter of the circle. Further, in case height information is employed as a vehicle condition, preferably, the greater the height from the road surface to the bottom face of the body of the vehicle 1, the greater the diameter of the circle, and the smaller the height, the smaller the diameter of the circle. Further, in case the road surface condition is superposed, preferably, the steeper the slope of the road surface or the more slippery the road surface, the greater the diameter of the circle, and the more gentle the slope of the road surface or the less slippery the road surface, the smaller the diameter of the circle. Needless to say, it is also possible to arrange such that the size of the diameter of the circle be displayed variably in accordance with the degree of the vehicle condition or road surface condition.

Figure 10:
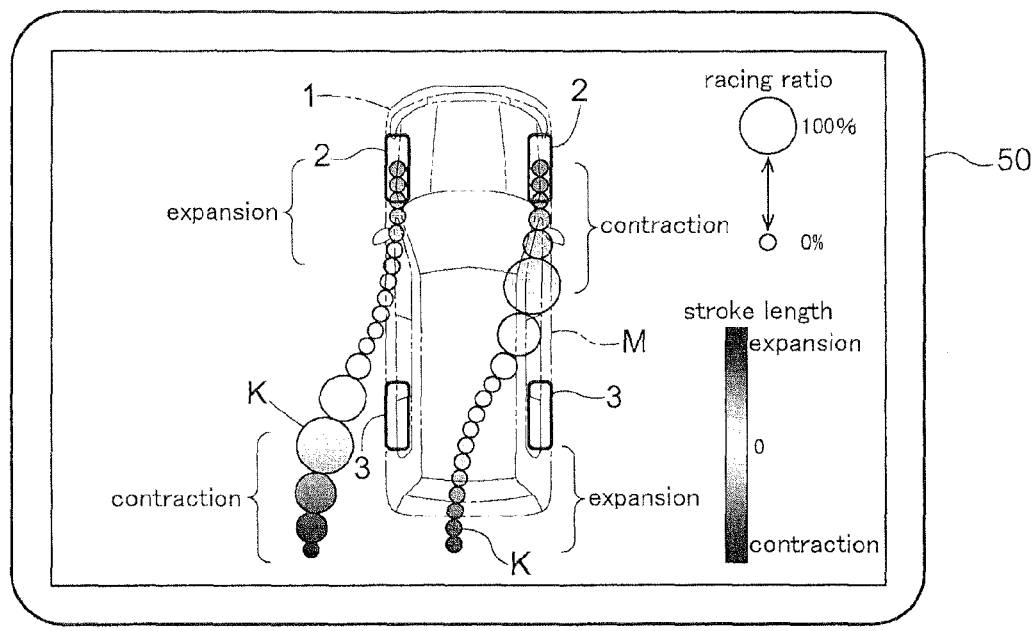
FIG. 10 is a view showing one example of a display image showing slip information and suspension information with traveling track.

Moreover, it is also possible to employ a plurality of kinds of information as a vehicle condition. One example of such display image is shown in FIG. 10. In the example shown in FIG. 10, slip information and suspension information are employed as vehicle conditions. In this case, preferably, the greater the racing ratio, the greater the diameter of the circle, and the smaller the racing ratio, the smaller the diameter of the circle. Further, preferably, the greater the change in the stroke length, the denser the color inside the circle, and the smaller the change in the stroke length, the thinner the color inside the circle.

Figure 11:
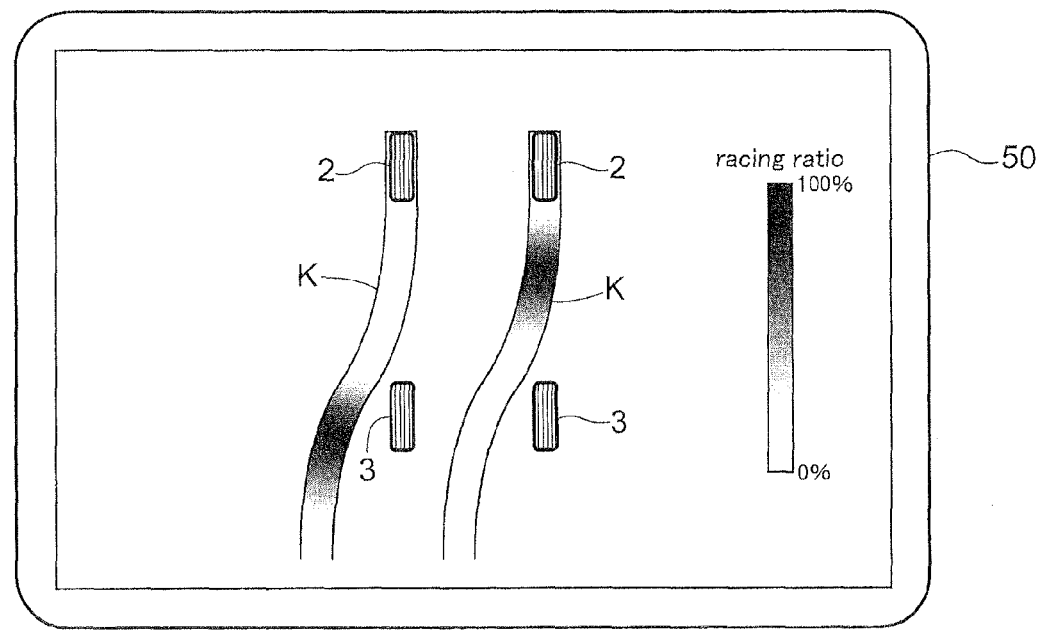
FIG. 11 is a view showing one example of a display image indicating traveling track relating to a further embodiment.

In the foregoing embodiment, it was explained that as the maker M specifying the position of the following wheel, a bird's-eye-view image of the vehicle 1 and a graphic image of the rear wheel 3 are preferably employed. However, the application range of the present invention is not limited thereto. It is possible as a matter of course to employ only a graphic image of the rear wheel 3 as the marker M as shown in FIG. 11.

In the foregoing embodiment, it was explained that the wheel position K stored in the wheel position storing section 12 is the position of the preceding wheel located on the forward side in the traveling direction of the vehicle 1. However, the application range of the present invention is not limited thereto. The wheel position K stored in the wheel position storing section 12 can be a position of the following wheel located on the rear side in the traveling direction of the vehicle 1. Further alternatively, it is also possible as a matter of course that the wheel position K stored in the wheel position storing section 12 can be both the preceding wheel and the following wheel.

In the foregoing embodiment, it was explained that the display image generating section 41 generates a display image to be displayed on the display unit 50 with using the wheel position K of the preceding wheel and the maker M. However, the application range of the present invention is not limited thereto. It is also possible as a matter of course to configure such that the display image generating section 41 generates a display image by synthesizing the wheel position K stored in the wheel position storing section 12 and the road surface information with a surrounding image based on a captured image capturing the scene in the periphery of the vehicle 1. With this configuration, the wheel position K and the surrounding situation can be displayed at one time on the display unit 50, so that the driver can readily imagine the surrounding situation at the time of traveling.

In such case, preferably, onboard cameras will be mounted to a front portion, a rear portion and right and left door mirrors of the vehicle 1. Then, based on captured images captured thereby, a surrounding image will be generated with using a known image processing and a display image can be generated by synthesizing the generated surrounding image with the wheel position K and the marker M. The surrounding image can be captured images per se captured by the onboard cameras or can be a bird's-eye-view image with the viewpoint being set above the vehicle 1. Needless to say, it is also possible that the bird's-eye-view image has a viewpoint set obliquely upwardly of the vehicle 1.

Figure 12:
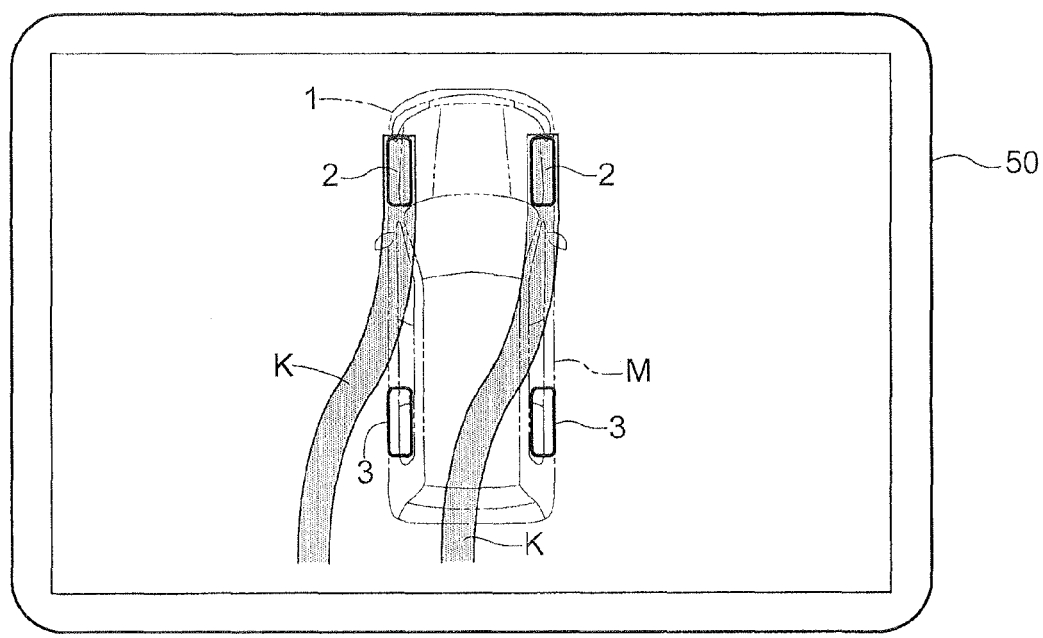
FIG. 12 is a view showing one example of a display image indicating traveling track.

Further, for example, as shown in FIG. 12, it is also possible as a matter of course to display with superposing only a traveling position of the preceding wheel with the display image. In FIG. 12, there are also shown a forward traveling state of the vehicle 1 as well as the rear wheels 3 as following wheels. With this, a passenger of the vehicle 1 can grasp through what courses the front wheels 2 have taken to reach the respective current positions, with reference to the wheel position K.

INDUSTRIAL APPLICABILITY

The present invention can be used in a vehicle-drive assisting apparatus assisting a deriver by displaying information relating to a vehicle drive on a monitor mounted on the vehicle.

DESCRIPTION OF REFERENCE MARKS/NUMERALS

1: vehicle
5: suspension
12: wheel position storing section
13: following wheel marker generating section
14: road surface information acquiring section
41: display image generating section
50: display unit
100: vehicle-drive assisting apparatus
K: wheel position (position of wheel)
M: marker

The invention claimed is:

1. A vehicle-drive assisting apparatus comprising:
a wheel position storing section storing positions where a left forward wheel has traveled is a forward direction and positions where the right forward wheel has traveled in the forward direction when a vehicle effects traveling, the left forward wheel and right forward wheel comprise preceding wheels located on the forward side in the forward traveling direction of the vehicle;
a road surface information acquiring section acquiring road surface information indicating a road surface condition of a road surface on which the forward wheels have traveled; and
a display image generating section generating a display image of the road surface information stored in the wheel position storing section and relating to the forward wheel position on a displaying unit provided in the vehicle, the display image including a first path indicating only the positions where the left forward wheel has traveled and a second path indicating only the positions where the right forward wheel has traveled, wherein the road surface information is superposed on the first path and on the second path.

2. The vehicle-drive assisting apparatus according to claim 1, the apparatus further comprises a following wheel marker generating section generating markers for specifying positions where following wheels of the vehicle have traveled; and
the display image generating section superposes the markers with the positions of the following wheels.

3. The vehicle-drive assisting apparatus according to claim 2, wherein the following wheels are located on the rear side in the traveling direction of the vehicle.

4. The vehicle-drive assisting apparatus according to claim 2, wherein the marker comprises a bird's-eye-view of the vehicle.

5. The vehicle-drive assisting apparatus according to claim 1, wherein the road surface information comprises roughness information indicating roughness on the road surface.

6. The vehicle-drive assisting apparatus according to claim 5, wherein the roughness information comprises suspension information indicating a suspension stroke length of a suspension mechanism suspending the wheel.

7. The vehicle-drive assisting apparatus according to claim 1, wherein the road surface information comprises information indicating slipperiness of the road surface.

8. The vehicle-drive assisting apparatus according to claim 7, wherein the information indicating slipperiness comprises slip information indicating slipping state of the wheel.

9. The vehicle-drive assisting apparatus according to claim 1, wherein the road surface information comprises height information indicating height from the road surface traveled by the vehicle to a bottom face of a body of the vehicle.

10. The vehicle-drive assisting apparatus according to claim 1, wherein the display image generating section synthesizes the positions where the forward wheels have traveled stored in the wheel position storing section and the road surface information with a surrounding image based on a captured image capturing a view surrounding the vehicle.

11. The vehicle-drive assisting apparatus according to claim 10, wherein the surrounding image comprises a bird's-eye-view image based on a viewpoint upwardly of the vehicle.

* * * * *